Nov. 28, 1961  R. EHLEY  3,010,524
HITCH ASSEMBLY
Filed Sept. 5, 1958  2 Sheets-Sheet 2
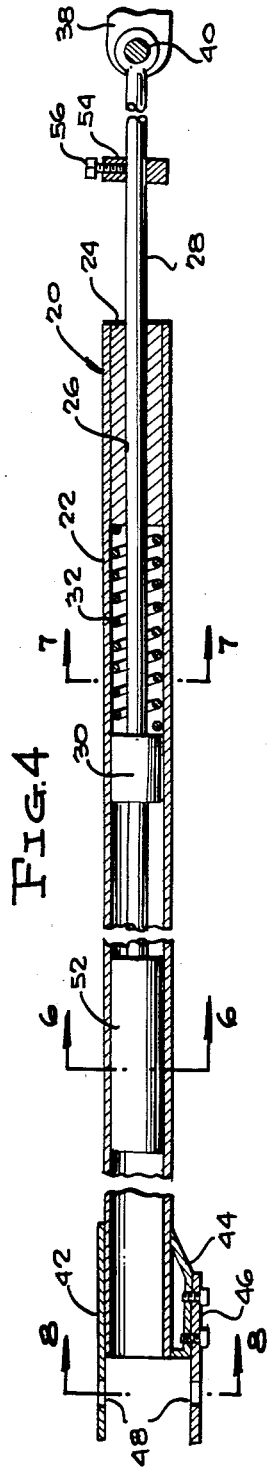
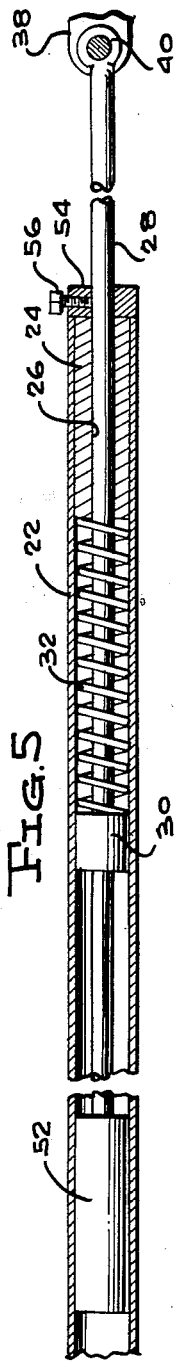
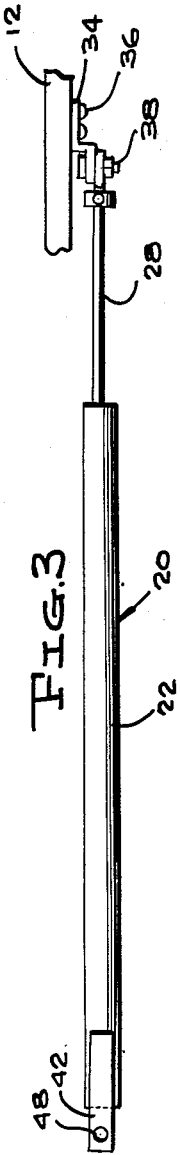
INVENTOR.
RUDOLPH EHLEY
BY
McMorrow, Berman & Davidson
ATTORNEYS ically disposed elongated tube 22 having

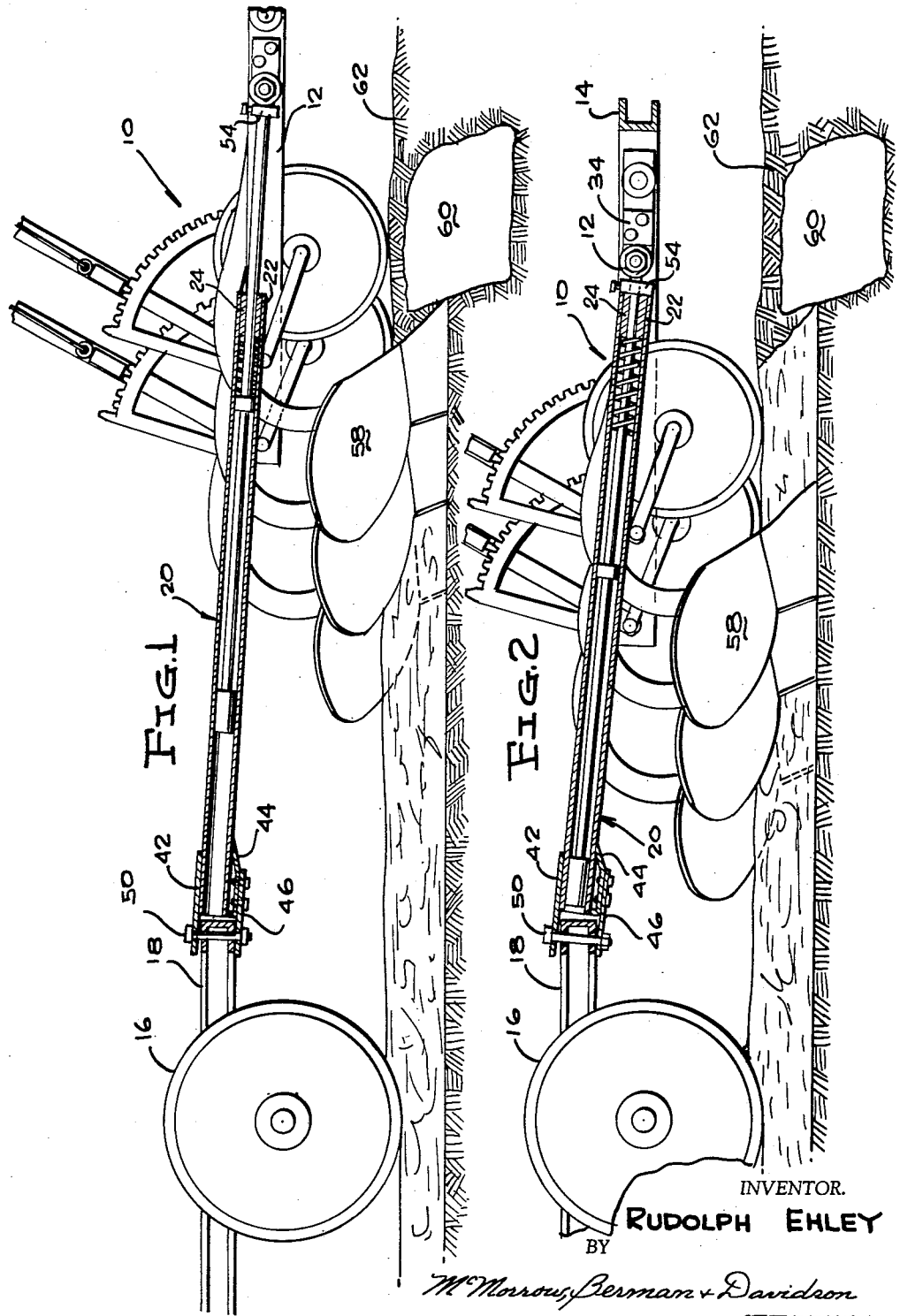

United States Patent Office 3,010,524
Patented Nov. 28, 1961

3,010,524
HITCH ASSEMBLY
Rudolph Ehley, 116 2nd Ave. SW., Ashley, N. Dak.
Filed Sept. 5, 1958, Ser. No. 759,189
1 Claim. (Cl. 172—170)

The present invention relates to farm implements generally, and in particular to a hitch means for a farm implement.

An object of the present invention is to provide a hitch means for attachment of a packer to a plow.

Another object of the present invention is to provide a hitch means for attaching a packer to a plow which enables the operator to back up the plow without moving the packer.

A further object of the present invention is to provide a hitch means for attaching a packer to a plow which absorbs the shocks of movement of the packer relative to the plow and thereby lessens the strain upon the hitch and saving the hitch from unnecessary wear and danger of breakage.

These and other objects and advantages of the present invention will be fully apparent from the following description when taken in conjunction with the annexed drawings, in which:

FIGURE 1 is a side elevational view of a plow and the forward end portion of a packer, showing the hitch means of the present invention in section connecting the packer to the plow and in a condition of traction between the plow and packer.

FIGURE 2 is a view similar to FIGURE 1, showing the plow reversed relative to the packer;

FIGURE 3 is a plan view of the hitch means of the present invention;

FIGURE 4 is a sectional view of the assembly shown in FIGURE 3 with portions of the hitch broken away, showing the hitch in a condition of traction;

FIGURE 5 is a view similar to FIGURE 4, showing the hitch in a condition of reverse movement of the plow relative to the packer;

FIGURE 6 is a view taken on the line 6—6 of FIGURE 4;

FIGURE 7 is a view taken on the line 7—7 of FIGURE 4; and

FIGURE 8 is a view taken on the line 8—8 of FIGURE 4.

Referring in greater detail to the drawings in which like numerals indicate like parts throughout the several views, the reference numeral 10 designates generally a gangplow having a frame 12 and a clevis 14 on its forward end for attachment to a towing vehicle. A land packer is arranged in tandem spaced relation with respect to the gangplow 10 and is represented by a wheel in FIGURES 1 and 2 and designated by the reference numeral 16.

The land packer 16 has a tongue 18 projecting from the forward end for attachment to the gangplow 10. The present invention provides a hitch means for connecting the tongue 18 of the packer 16 to the frame 12 of the gangplow 10.

The hitch means of the present invention is designated generally by the reference numeral 20 and comprises a horizontally disposed elongated tube 22 having both ends open. A plug is positioned within one of the closed ends of the tube 22, as at 24 in FIGURES 4 and 5, the plug 24 being fixedly secured to the tube 22 and provided with a longitudinally extending bore 26. A rod 28 extends slidably through the plug 24 and has one end inwardly of and spaced from the plug 24 and has the other end exteriorly of and spaced from the plug 24.

A collar 30 is fixedly secured to the rod 28 inwardly of the end which is within the tube 22 and a compressed coil spring 32 is circumposed about the portion of the rod 28 between the collar 30 and the adjacent end of the plug 24.

Cooperating attaching means is provided on the end of the rod 28 remote from the collar 30 and on the plow frame 12 detachably connecting the rod 28 to the frame 12 for movement therewith. This means is shown in plan view in FIGURE 3 and consists in a Z-shaped bracket 34 fixedly secured by rivets 36 or other means to the side of the frame 12 inwardly of the clevis 14. A bolt and nut assembly 38 provides means for connecting the eye formation 40 on the adjacent end of the rod 28 to the free leg of the bracket 34.

Means is provided on the other end of the tube 22 remote from the eye formation 40 of the rod 28 for connecting the tube 22 to the land packer 16. This means consists in a pair of plates 42 and 44 welded to the end portion of the tube 22 and an extension plate 46 bolted to the plate 44. The plates 42 and 46 are provided with registering apertures as at 48 in FIGURE 4 receiving a hitch pin 50 extending through aligned apertures in the tongue 18 of the packer 16.

The rod 28 extends inwardly of the tube 22 beyond the collar 30 and carries a plunger 52 slidable within the tube 22 for supporting the rod 28 against unnecessary wear of the collar 30 which is loosely positioned within the tube 22.

Another collar 54 is positioned on the portion of the rod 28 exteriorly of the tube 22 and has a set screw 56 extending through the bore therein and engageable with the rod 28 for adjustably positioning the collar 54 at any selected point along the adjacent portion of the rod 28.

In use, the Z-shaped bracket 34 is fixedly secured to the side of the plow frame 12 and the tube 22 is positioned outwardly of and extending to the rear of the frame 12 with the packer 16 positioned in tandem relation and secured to the tube 22 by the hitch pin 50. Under normal draft conditions, the spring 32 will be compressed as the plow frame 12 moves forwardly pulling the packer 16 therebehind. Upon one of the plowshares of the plow 10 engaging a stone or other obstruction in the ground as in FIGURE 1, the land packer 16 rolls forwardly of its own momentum releasing the compression of the spring 32. This freedom of the packer 16 to roll forwardly independently of the movement of the plow frame 12 saves wear and tear upon the hitch connecting the packer to the plow. The sliding movement of the collar 30 within the tube 22 permits the operator of the towing vehicle to back up the towing vehicle, pushing the plow frame 12 rearwardly, as at FIGURE 2 until the collar 54 engages the end of the tube 22, thus freeing the plowshares 58 of the plow 10 from the obstruction 60 within the ground surface 62 without moving the land packer 16 rearwardly.

As seeders or planters are invariably towed behind the land packers and are movable therewith, any rearward movement of the packer 16 invariably clogs the discharge tubes of the seeders or planters and the feature of the present invention of being able to shift the plow frame 12 a short distance rearwardly without disturbing the packer 16 relieves the operator of the vehicle of the necessity of clearing such discharge tubes of such seeder or planter. It also permits the freeing of the plowshares 58 from the obstruction 60 or stone in the ground surface 62 without strain upon the hitch means which connects the packer 16 to the plow 10.

What is claimed is:

The combination of a mobile frame carrying a plow, and a land packer having a tongue projecting from the forward end thereof arranged in tandem relation with respect to said frame, of a hitch means connecting the tongue of said packer to said frame comprising a horizontally disposed elongated tube having one end open, a plug closing the opposite end of said tube and fixedly secured to said tube, a rod extending slidably through said plug and having one end inwardly of and spaced from said plug and having the other end exteriorly of and spaced from said plug, a collar fixed on said rod inwardly of said one end thereof, a compressed coil spring circumposed about the portion of said rod between said collar and said plug, cooperating attaching means on said other end of said rod and said frame detachably connecting said rod to said frame for movement therewith, and means on the other end of said tube connecting said tube to said packer tongue.

References Cited in the file of this patent

UNITED STATES PATENTS

| | | |
|---|---|---|
| 1,383,017 | Pelton | June 28, 1921 |
| 1,679,628 | Roby | Aug. 7, 1928 |
| 2,422,530 | Court | June 17, 1947 |
| 2,538,301 | Duchscherer | Jan. 16, 1951 |
| 2,596,629 | Ward | May 13, 1952 |
| 2,780,478 | Forsyth | Feb. 5, 1957 |
| 2,943,692 | Hyland et al. | July 5, 1960 |